(No Model.) 6 Sheets—Sheet 1.

G. D. BURTON.
STOCK CAR.

No. 391,579. Patented Oct. 23, 1888.

WITNESSES INVENTOR.

(No Model.) 6 Sheets—Sheet 2.

G. D. BURTON.
STOCK CAR.

No. 391,579. Patented Oct. 23, 1888.

WITNESSES. INVENTOR.

(No Model.)  6 Sheets—Sheet 4.

G. D. BURTON.
STOCK CAR.

No. 391,579.  Patented Oct. 23, 1888.

WITNESSES.  INVENTOR (No Model.)
G. D. BURTON.
STOCK CAR.
No. 391,579. Patented Oct. 23, 1888.
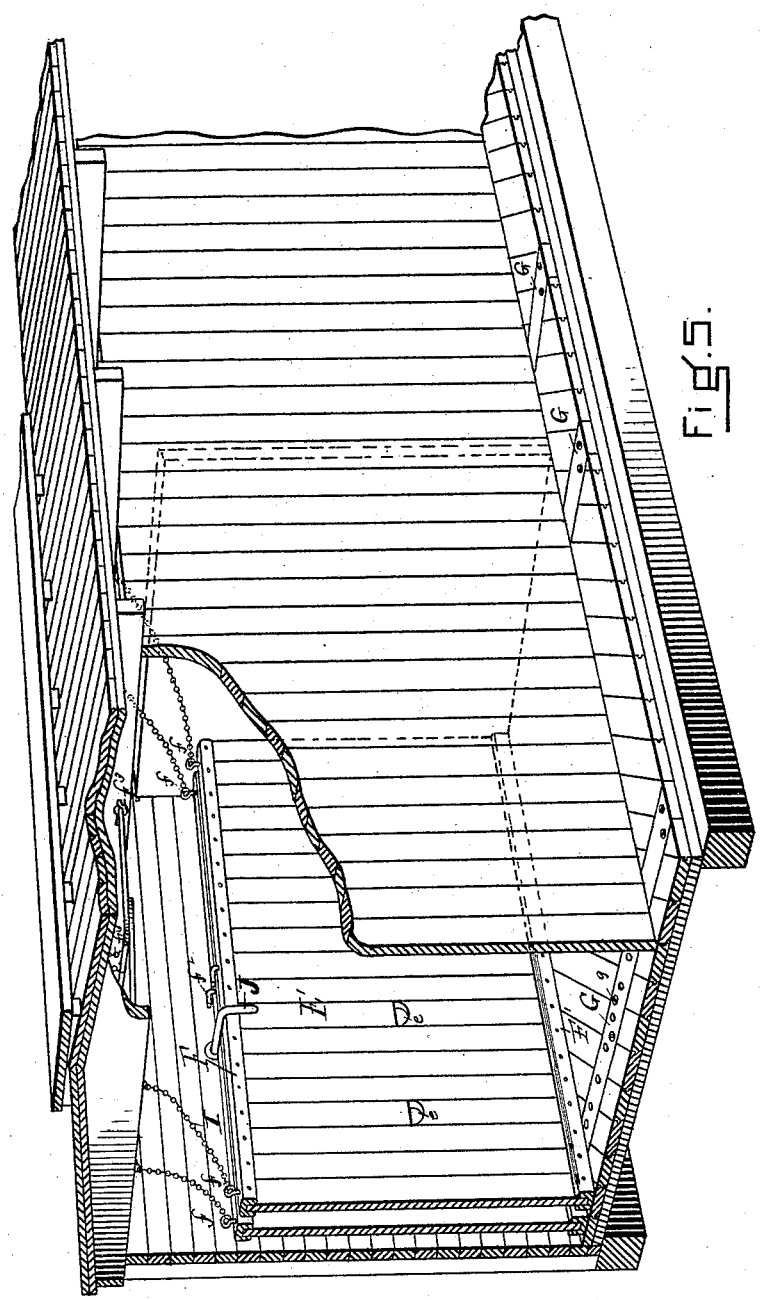

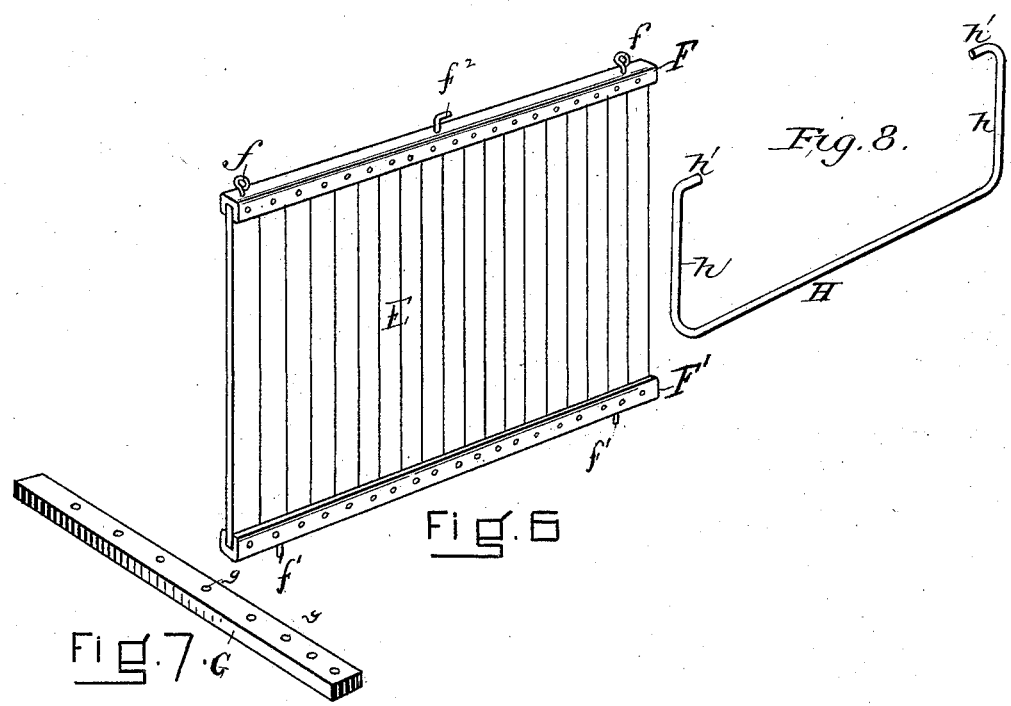

UNITED STATES PATENT OFFICE.

GEORGE D. BURTON, OF BOSTON, MASSACHUSETTS.

STOCK-CAR.

SPECIFICATION forming part of Letters Patent No. 391,579, dated October 23, 1888.

Application filed January 14, 1888. Serial No. 260,727. (No model.)

*To all whom it may concern:*

Be it known that I, GEORGE D. BURTON, a citizen of the United States, residing at Boston, in the county of Suffolk and Commonwealth of Massachusetts, have invented certain new and useful Improvements in Stock-Cars; and I do hereby declare the following to be a full, clear, and exact description of the invention, such as will enable others skilled in the art to which it appertains to make and use the same.

This invention has relation to an improvement in that class of railway-cars designed for the transportation of live stock; and it consists in certain peculiarities in the construction, arrangement, and combination of parts, substantially as hereinafter described, and more particularly pointed out in the appended claims.

Figure 1:
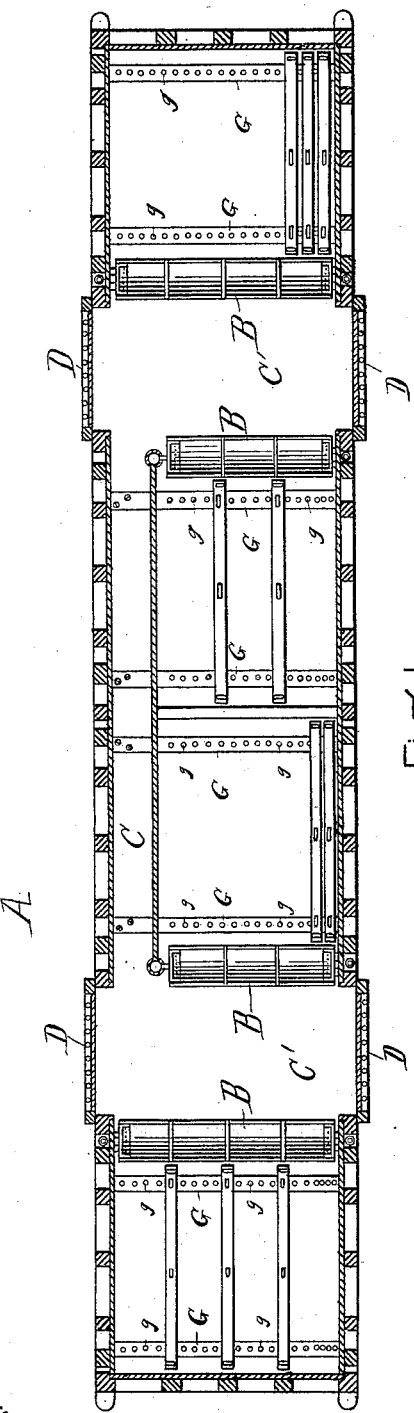
Figure 2:
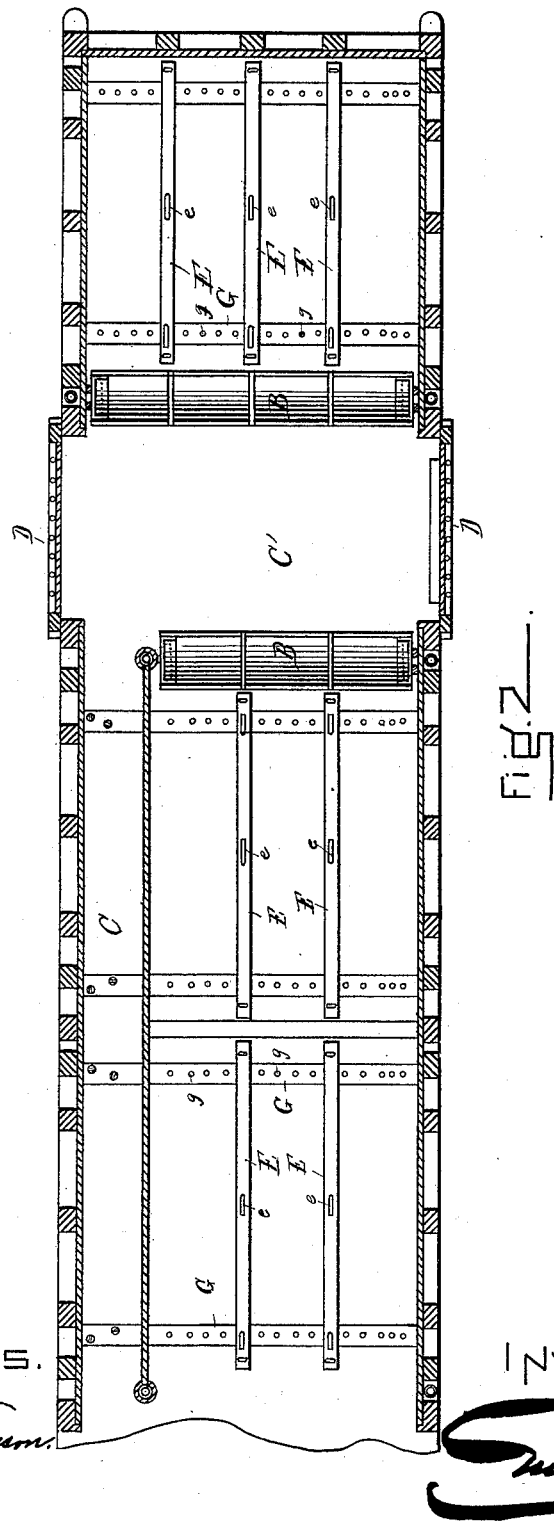
Figure 3:
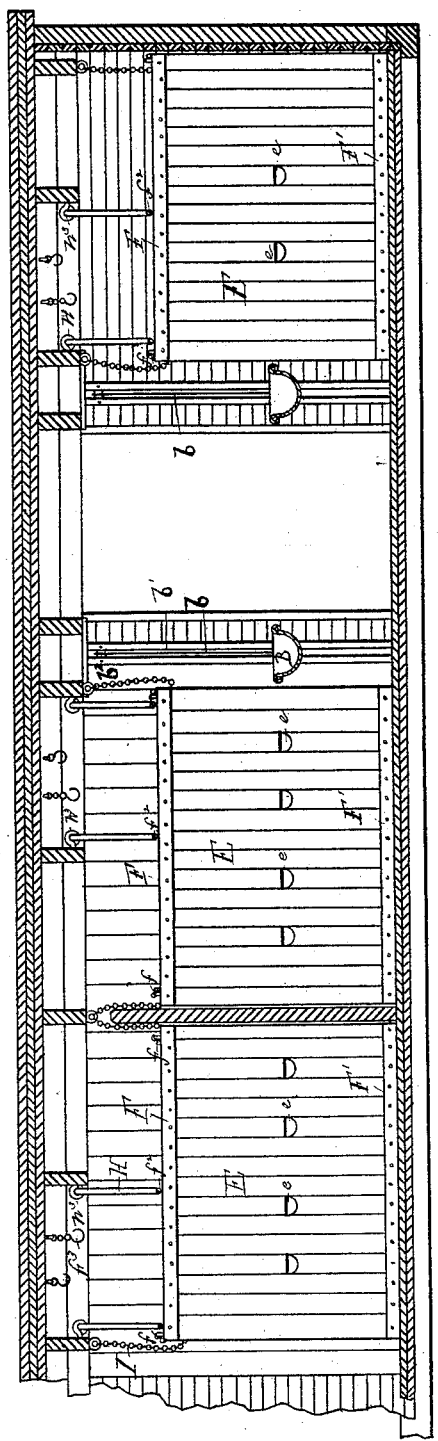
Figure 4:
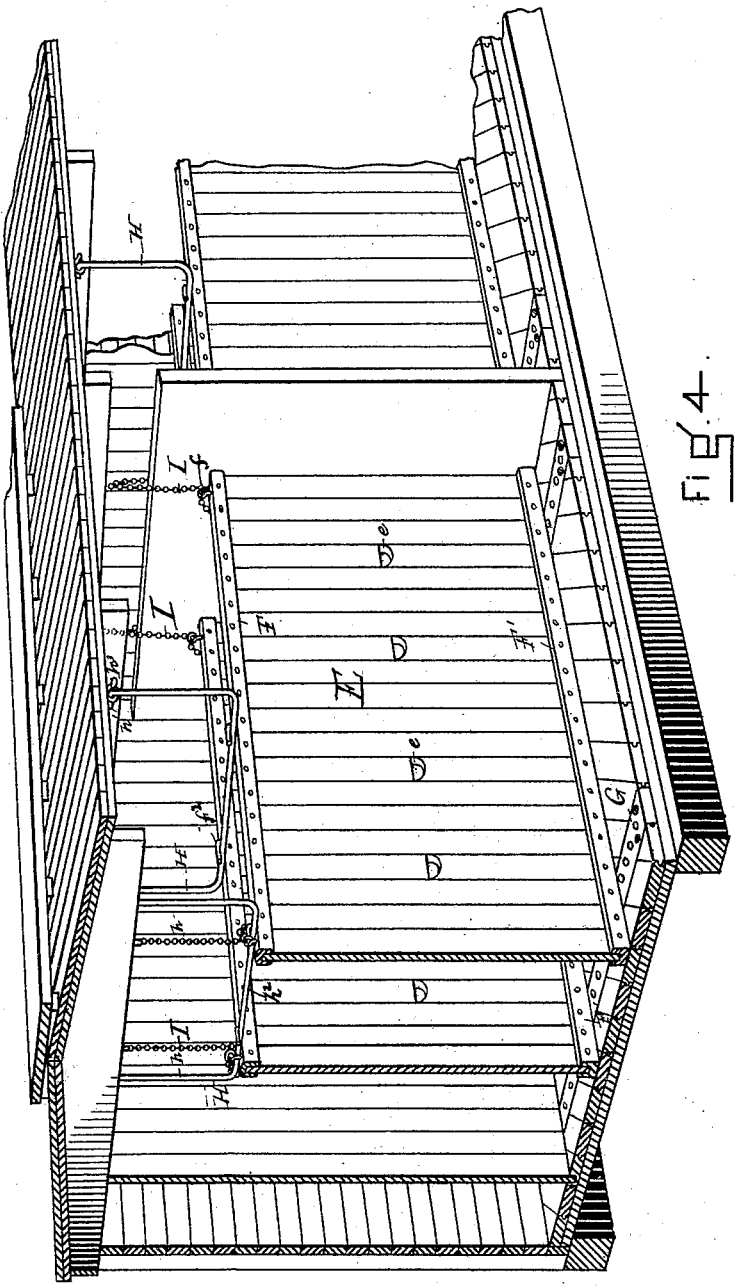

In the accompanying drawings, illustrating the invention, Figure 1 is a longitudinal section of my improved stock-car. Fig. 2 is an enlarged view of two-thirds of the car-body. Fig. 3 is a vertical section showing the means for bracing the upper portion of the stall-partitions. Fig. 4 is a perspective view of a portion of the main car-body with one side of the same removed, and showing more particularly the means for bracing the stall-partitions. Fig. 5 is a similar view of the opposite side of the main car-body, showing the stall-partitions drawn to one side and secured together, converting the car into an ordinary box-car and adapting it for the transportation of freight of the ordinary character. Fig. 6 is a detail representation of one of the stall-partitions, showing the manner of its construction. Fig. 7 is a detail representation of one of the perforated bars for supporting the lowermost extremities of the stall-partitions. Fig. 8 is a detail representation of one of the bracing-rods for the stalls.

Like letters of reference designate corresponding parts in the several figures.

A represents the main car-body, which may be constructed of any suitable size, and is provided in its interior with feed-troughs B, preferably arranged as shown, and having aisle-spaces C and C', the spaces C' being situated between the pairs of feed-troughs at either end of the car and transversely of the car-body, and the spaces C extending longitudinally of the main car-body at the side and opening communication between the aisles C', as shown. The main car-body is also provided with doors D, serving as a means of entrance and exit for the car and situated on either side thereof at the ends of the aisle-spaces C'. As shown in Figs. 1 and 2, it will be seen that the stalls extend longitudinally of the car, and that the feed-troughs are situated at the open ends of the stalls, so that in order to load the car with stock it will be necessary to back them therein. In order to permit this entrance into the stalls of the animals and also to permit the converting of the car from a stock to an ordinary box-car the said troughs, as shown in Fig. 3, have secured at their extremities cables or ropes $b$ passing within guides $b'$ to and around a pulley, $b^2$, situated near the top of the car, and thence downward in a box, and are provided on their extremities with counterbalancing weights. (Not shown.) It will thus be seen that the said troughs are capable of being raised to the top of the car when not in use, and will be held in that position by the counterbalancing weights.

Upon reference to Fig. 6 it will be seen that the partitions E, dividing the car into stalls, are bound at their upper and lower ends with recessed or U-shaped rods or bars F F', bolted or otherwise secured thereto and extending the entire length thereof. The upper of these bars, F, is provided at either extremity with eyes $ff$, and at or near its center with a hook, $f^2$, while the bar F' is formed with downwardly-projecting lugs $f'$, the purposes of which constructions will be hereinafter fully set forth.

Immediately to the rear of the feed-troughs B, and also near the opposite ends of the stalls, are rods or strips G, (shown in detail in Fig. 7,) extending transversely of the car-body and preferably countersunk into the floor thereof. These rods or strips G are formed with series of perforations $g$, adapted to receive the lugs $f'$ of the stall-partitions E. It will thus be seen that the said stall-partitions are capable of lateral adjustment in order to increase or diminish the size of the stalls to accommodate animals of different sizes, simply by placing the lugs thereof within any of the series of perforations; and in order to facilitate the handling of these partitions they are formed with hand-holes $e$, as shown. The upper extremities of these stall-partitions E are braced and held in position against vertical displacement by means of bracing-rods H and the chains or cables I, as shown in Fig. 4. The bracing-rods H are shown in detail in Fig. 8, and they comprise the vertical arms $h$, having the flanges $h'$, adapted to pass through eyes $h^3$, secured to the top of the car, and the horizontal portions $h^2$, which extend across the series of partitions E and come into engagement with and are held from displacement by the hooks $f^2$ of the said partitions. Obviously when it is desired to disengage the partitions from these bracing-rods it can be accomplished simply by swinging the said bracing-rods out of engagement with the hooks $f^2$ and into engagement with the hooks $f^3$, depending from the top of the car, which hooks $f^3$ will obviously hold the said rods up out of the way. The chains I are secured to the top of the car and pass through the eyes $f$ of the stall-partitions E, they being preferably made of sufficient length to permit of the lateral adjustment of the said partitions without coming out of engagement with the eyes $f$, as shown in Fig. 5. It will be quite obvious, however, that these cables I might have their lower free extremities formed with hooks for engagement with the eyes $f$ without departing from the spirit of the invention, in which event they will be disengaged from the said eyes in the manner set forth in connection with the bracing-rods H.

When it is desired to convert the car from a stock into an ordinary box or freight car, the stall-partitions are all located to one side of the car-body, and are secured in a vertical position by means of the hook J, which is preferably pivoted to the side of the car-body, as shown in Fig. 5, the bracing-rods H secured to the top of the car, and the feed-troughs also located at the top of the car, when obviously a practically single compartment will be formed, no fixtures being in the way to hinder the adapting of the car for the transportation of freight.

It will be observed that the invention is shown as embodied in a car constructed after the general plan shown in my patent, No. 374,824, granted December 13, 1887; but it will be quite obvious that I do not wish to be understood as limiting myself to its connection with a car constructed after the said plans.

It will doubtless be found in the practical construction of the invention herein shown and described that many of the details of construction might be advantageously varied; and I therefore do not wish to be understood as limiting myself to the precise construction set forth, but reserve the liberty of varying the details without departing from the general spirit of the invention.

Having now described the construction, operation, and advantages of my invention, and having set forth a preferred means of carrying the same into effect, what I believe to be new, and desire to secure by Letters Patent, and what I therefore claim, is—

1. In a stock-car, the combination, with the main car-body, of laterally-adjustable stall-partitions and bracing-rods resting thereupon and keeping the said partitions from displacement when located in position.

2. In a stock-car, the combination, with the main car-body, of laterally-adjustable stall-partitions and bracing-rods resting thereupon formed with lugs or projections placed within eyes above the partitions, whereby the said bracing-rods can be swung up out of contact with the stall-partitions, for the purpose herein set forth.

3. In a stock-car, the combination, with the main car-body having transverse bars formed with series of perforations, of stall-partitions having lugs or projections for engagement with the said perforations, and having also hooks upon their upper extremities, and transverse bracing-rods for keeping the said partitions from displacement when located in position, and themselves held against displacement by the hooks upon the stall-partitions.

4. In a stock-car, the combination, with stall-partitions, of transverse bracing-rods for the same depending from the top of the car and resting upon the top of the said partitions.

5. In a stock-car, the combination, with laterally-adjustable stall-partitions having eyes and hooks upon their upper extremities, of depending chains or cables and transverse pivoted rods, all arranged in the manner and for the purposes substantially as herein shown and set forth.

6. In a stock-car, the combination, with laterally-adjustable stall-partitions, of pivoted transverse bracing-rods for the same depending from the top of the car and resting upon the tops of said partitions, and hooks or catches for supporting said bracing-rods when not in use, for the purposes substantially as herein shown and set forth.

7. A stock-car having transverse perforated bars, and stall-partitions formed with lugs adapted to engage the perforations of the said bars, for the purpose set forth, in combination with hooks pivoted in the sides of the car, substantially as described, whereby the said partitions, when the car is converted into a box or freight car will be supported to one side thereof by their engagement with the perforated bars at these points and by the pivoted hooks.

In testimony whereof I affix my signature in presence of two witnesses.

GEO. D. BURTON.

Witnesses:
WILLIAM M. NASH,
CHAS. F. ADAMS.